United States Patent
Chiang

(10) Patent No.: US 8,108,473 B2
(45) Date of Patent: Jan. 31, 2012

(54) MOBILE PHONE WITH CDMA AND AN AUDIO/VIDEO ELECTRONIC MAIL GENERATOR, AND METHOD OF SENDING/RECEIVING AN AUDIO/VIDEO ELECTRONIC MAIL

(76) Inventor: Kuo-Ching Chiang, Linkou Township, Taipei County (TW)

( * ) Notice: Subject to any disclaimer, the term of this patent is extended or adjusted under 35 U.S.C. 154(b) by 194 days.

(21) Appl. No.: 11/979,685

(22) Filed: Nov. 7, 2007

(65) Prior Publication Data
US 2008/0109522 A1 May 8, 2008

(30) Foreign Application Priority Data
Nov. 8, 2006 (TW) ................................ 95141420 A

(51) Int. Cl.
*G06F 15/16* (2006.01)
(52) U.S. Cl. ........................................ 709/206; 709/204
(58) Field of Classification Search .................... 709/206
See application file for complete search history.

(56) References Cited

U.S. PATENT DOCUMENTS

| | | | | |
|---|---|---|---|---|
| 6,405,225 B1* | 6/2002 | Apfel et al. | | 715/210 |
| 2002/0169841 A1* | 11/2002 | Carlson et al. | | 709/206 |
| 2003/0177193 A1* | 9/2003 | Budge et al. | | 709/206 |
| 2006/0033809 A1* | 2/2006 | Farley | | 348/14.01 |
| 2009/0106380 A1* | 4/2009 | Asthana et al. | | 709/206 |

* cited by examiner

*Primary Examiner* — Wing Chan
*Assistant Examiner* — Andrew Woo
(74) *Attorney, Agent, or Firm* — Chih Feng Yeh; Huntington IP Consulting Co., Ltd.

(57) ABSTRACT

An audio/video electronic mail system which is stored in a computer readable or access-able storage media comprises an address book providers to access to directory information; an audio/video e-mail generator coupled to the address and provided to generate an audio/video e-mail; a spooler coupled to the audio/video e-mail generator and responsible for sending messages to and receiving message from a messaging system; and a transport providers coupled to audio/video e-mail generator to handle message transmission and reception.

5 Claims, 2 Drawing Sheets

MOBILE PHONE WITH CDMA AND AN AUDIO/VIDEO ELECTRONIC MAIL GENERATOR, AND METHOD OF SENDING/RECEIVING AN AUDIO/VIDEO ELECTRONIC MAIL

FIELD OF THE INVENTION

The present invention relates generally to a electronic mail system, and more particularly to a audio/video electronic mail system.

BACKGROUND OF THE INVENTION

Communication and electronic product are widely spread since the technology and products are driven by lighter weight, smaller size and higher speed requirements. The field of telecommunication and internet also follow the tread to develop more convenient product and launch to the market. The communication is, therefore, booming day by day. The network, mobile device, personal assistant device are the essential device for the human daily life. The network service provider and device maker are continuously to offer better service and solution to the user. U.S. Pat. No. 6,549,950 disclosed a conventional E-mail system. However, the current electronic mail system is still based on text.

SUMMARY OF THE INVENTION

An audio/video electronic mail system which is stored in a computer readable or access-able storage media comprises an address book providers to access to directory information; an audio/video e-mail generator coupled to the address and provided to generate an audio/video e-mail; a spooler coupled to the audio/video e-mail generator and responsible for sending messages to and receiving message from a messaging system; and a transport providers coupled to audio/video e-mail generator to handle message transmission and reception. The audio/video e-mail system coupled to a microphone and an image capturing device. The spooler is located at the MAPI that provides high-level function that can be used to implement sophisticated messaging features with a relatively small amount of code.

The audio/video e-mail system is embedded into a computer readable medium of a computer, notebook or web server, a mobile phone, PDA or media player. In the case of server, the audio/video e-mail generator is stored in the remote server (remote terminal computer), and the microphone and image capturing device are set at the local terminal computer.

The method for generating audio/video e-mail comprises: activating an audio/video e-mail system having an audio/video e-mail generator at the remote terminal server for generating at least one of audio and video e-mail; selecting the audio/video e-mail generator to prepare the audio/video e-mail; triggering at least one of a microphone and an image capturing device at the local terminal computer to store at least one of a vocal message and image message to generate the audio/video e-mail; and sending the audio/video e-mail.

The MAPI architecture is designed to write messaging-enabled applications that are independent of the underlying messaging system. MAPI provides high-level function that can be used to implement sophisticated messaging features with a relatively small amount of code. The underlying messaging system is completely transparent. The MAPI subsystem is made up of the MAPI spooler, the programming interfaces. The MAPI spooler is a separate interface that is responsible for sending messages to and receiving messages from a messaging system. The MAPI service providers are located between MAPI subsystem and the messaging systems. Messages are created using a form that is appropriate for the specific type, or class, of message. Address book providers handle access to directory information. MAPI integrates all the information supplied by the installed address book providers into address book. Message store providers handle the storage and retrieval of messages and other information for the users of client application.

DETAILED DESCRIPTION

The present invention relates generally to an electronic mail system. The portable device includes but not limited to cellular phone, PDA (personal digital assistant), smart phone, notebook, digital still camera, digital video camera, medium player (MP3, MP4), GPS and the equivalent thereof. The wireless communication portable device may include dual-way transmission protocol, such as GSM, CDMA or PHS.

The present invention relates to electronic mail system. It can be applied to any suitable e-mail module, for instance, Microsoft Outlook, Fire Fox, KK Man and any other web mail system. In one embodiment, the electronic mail system is incorporate with computer platform and operation system. Under such scheme, the electronic mail module may be utilized by the user for transmitting, receiving electronic mail. The electronic mail system includes pluralities of sub-modules, for example, including a calendar manager, a task list manager, a contact manager, a message manager (e-mail), and a notes manager. Although the preferred embodiment will be generally described in the context of a program and an operating system running on a personal computer, those skilled in the art will recognize that the present invention also can be implemented in conjunction with other program modules for other types of computers, or operation system such as Macintosh, I-Mac, I-book serious developed by Apple.

The electronic mail system is developed over ten years. However, these messages are simple text messages and are presented by text. The present invention provides video/audio mail system to offer additional functions and pleasure. The computer generally includes CPU, memory, display, I/O etc. The present invention may be applied to the heterogeneous distributed computing environment, for instance, remote server.

Figure 1:
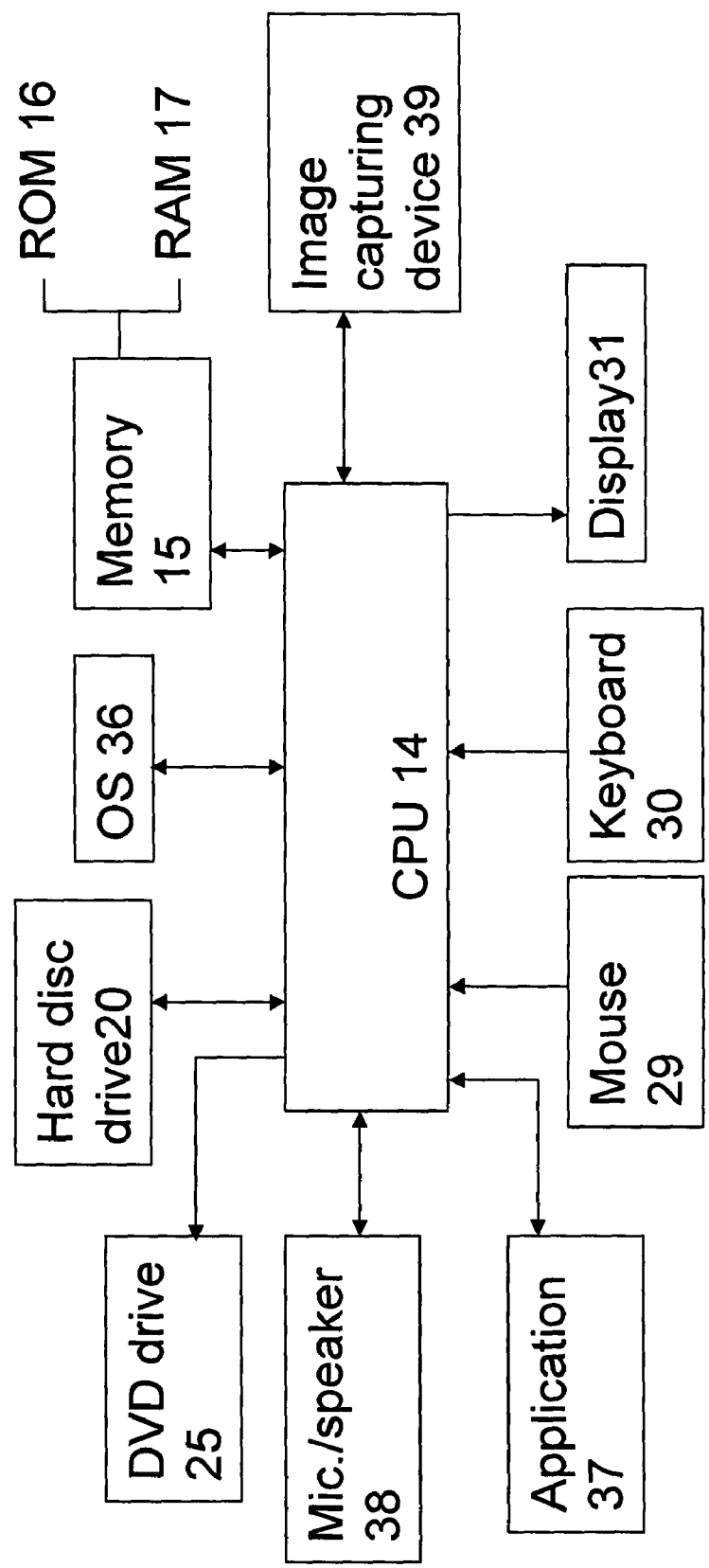
FIG. 1 shows a diagram of a computer system according to the present invention.

As shown in FIG. 1, the computer includes a central processing unit (CPU) 14 and memory 15 including read only memory (ROM) 16 and random access memory (RAM) 17), which is coupled to the CPU 14. The computer 10 uses BIOS stored in the ROM 16 to operation. The BIOS is a set of basic routines to transfer information between elements within the computer 10. Those skilled in the art will also appreciate that the present invention may be used for computers without BIOS, such as "POWER PC". A hard disk drive 20 is coupled to the CPU 14. A DVD drive 25 is also coupled to the CPU 14. A user inputs instructions to the personal computer 10 via input devices, such as a keyboard 28 and a mouse 29. A display 31 is connected to the CPU 14. OS 36 and applications 37 are stored on the computer readable medium. Microphone and speaker 38 are coupled to the CPU 14, an image capturing device 39 is also coupled to the CPU 14.

Figure 2:
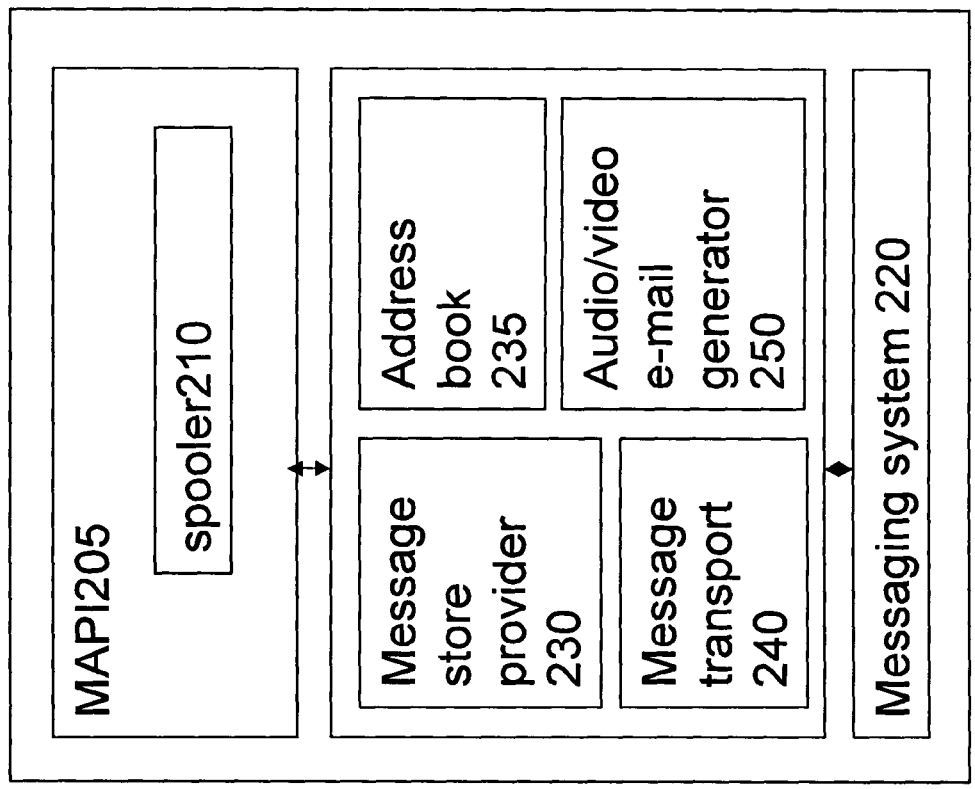
FIG. 2 shows a diagram of a audio/video e-mail system according to the present invention.

Those skilled in the art will recognize that the present invention may be applied to other operation system and not limited to the OS described below. The operating system provides a variety of functions or services that allow an application program to easily process various types of input/output. In one of the preferred embodiments, the operating system incorporates the Messaging Application Programming Interface (MAPI). The MAPI architecture is designed to make it easy for programmers to write messaging-enabled applications that are independent of the underlying messaging system. MAPI provides high-level function that can be used to implement sophisticated messaging features with a relatively small amount of code. The code deals with functions, for example, sending, receiving, and addressing messages. The underlying messaging system is completely transparent. MAPI also provides other message-related functionality, such as access to address books. Please refer to FIG. 2, the MAPI subsystem is made up of the MAPI spooler 210. The MAPI spooler 210 is a separate interface that is responsible for sending messages to and receiving messages from a messaging system. The spooler 210 is in the MAPI 205 subsystem.

The MAPI service providers are located between MAPI subsystem 205 and the messaging systems 220. Service providers are drivers that connect MAPI client applications to an underlying messaging system 220. MAPI service providers include: message store providers 230, address book or directory providers 235, and message transport providers 240. The service providers work with MAPI to create and send messages in the following way. When the client sent the message, the message store provider 230 will check recipient that has valid address. Address book providers 235 handle access to directory information. For example, address book providers 235 store a recipient's name, address, and address type.

Transport providers 240 handle message transmission and reception. They control the interaction between the MAPI spooler and the underlying messaging system 220. When an incoming message is detected, the transport provider 240 informs the MAPI spooler and the message is delivered to the appropriate message store. To handle outgoing messages, the message store moves the message to the outbound queue, informs the MAPI spooler, and the spooler transfers it to the appropriate transport providers.

The user transmit the message to the receiver, message store provider and the message transport are used to perform the function. The conventional method may process the text only. MAPI property has a value, a type, and an identifier. The value is the descriptive data, such as the text in a message body. The type describes the kind of data, such as a string, numeric, or Boolean. The identifier is the number that uniquely describes the property. The identifier and type are combined to form a "property tag," which is a constant that can be used to easily refer to the property. For example, PR_MESSAGE_BODY is the tag for the message body property. The property tag and value are stored together in system memory as a single data structure. Every custom form implements a set of standard menu commands, for example, open, create, delete, or reply. The present invention also includes calendar module, task list manager. The information of the E-mail includes "send to whom", "from who", "cc", "subject" and "date".

The present invention includes audio/video electronic mail generator 250 over the message system 220 for generating video and vocal message. When the module 250 is active, the computer system will active the image capture device to capture the user image and record the vocal message of the user through microphone. The control unit of the computer may integrate the audio and video signals to create the audio/video e-mail through the audio/video electronic mail generator 250. After the user input the address of the receiver, the audio/video e-mail may be transmitted by the transport provider 240. When the sender sent the message, the transport provider 240 process the transmission process and the message store provider 230 save a copy in the system for record. Alternatively, the user may select only one of the audio and video functions.

Figure 3:
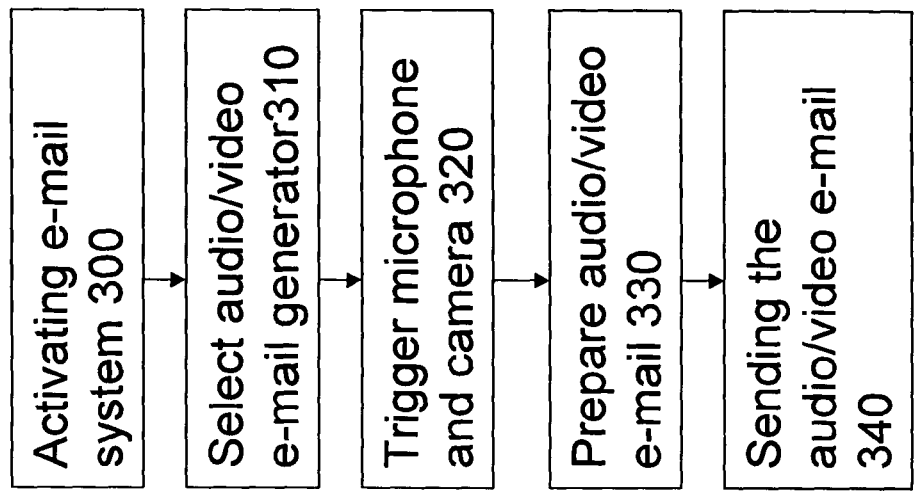
FIG. 3 shows a flow diagram the method according to the present invention.

Please refer to FIG. 3, the method associated with the present invention includes the steps of activating the e-mail system in step 300. The electronic system includes audio/video e-mail generator. The next step 310 is to select the audio/video e-mail button of the system to active the audio/video e-mail generator to generate the audio/video e-mail, followed by triggering at least one of the microphone and digital camera or the like, 320. The next step is to generate and prepare the audio/video e-mail by the audio/video e-mail generator, 330. Then, the user may transmit the audio/video e-mail.

A message store provider 230 initiates the sending process. The MAPI spooler receives the message, performs any required preprocessing, and delivers it to the appropriate transport provider 240. The transport provider 340 gives the message to its messaging system 220, which sends it to the intended recipient(s). When a message is received, the transport provider 240 receives a message from its messaging system 220 and notifies the MAPI spooler 210. The spooler 210 performs any necessary post processing and informs the message store provider 230 that a new message is received. The system refreshes the message and displays. When the user opens the e-mail, it displays by the audio/video type instead of conventional text. The receiver may receive the audio message through the output of the speaker and the video signal is displayed on the display. Accordingly, the text message may be shown on the display as well.

When the user would like to send the audio/video e-mail and input the instruction of creating a new mail, the user may initiate the generation of audio/video mail, then inputs the receipt address, or vice verse.

As mentioned above, the preferred embodiment of the present invention is represented by the "MICROSOFT OUTLOOK" or "Express" which is published by Microsoft Corporation. Those one skilled in the art may recognize that the present invention may be applied to other system. It may be completed through MAPISendMail and SubmitMessage. At the terminal of the receiver, the new coming message may be shown in the mail box of the e-mail system. After the user click and open the mail, the vocal message is output from the speaker and the video message is displayed on the display.

Therefore, the audio/video e-mail system is different from the prior text e-mail system. The method can be used in Apple system, web mail system. Alternatively, the present invention may be integrated into the mobile phone terminal or PDA, thereby allowing the user may receive the audio/video e-mail portably. If the e-mail system is based on the web base, the user may couple to the web mail service provider through the browser before receiving or sending mails. As mentioned in [0010], the wireless communication portable device may include dual-way transmission protocol, such as GSM, CDMA or PHS. GSM and PHS are available to achieve the purpose if only the vocal is required to be transmitted. However, if the video data is required to be received and transmitted, simultaneously, the mobile communication protocol is well-known to be at least third generation mobile protocol, such as CDMA with suitable wide band. From above, the mobile phone with at least third generation mobile protocol and an audio/video electronic mail generator comprises the audio/video e-mail generator provided to generate an audio/video e-mail. The audio/video e-mail is processed by said audio/video electronic mail generator and transmitted and received by said at least third generation mobile protocol. The present invention may allow the user portably receive the video/audio e-mail without the space limitation and free from the computer.

If the mobile phone includes internet work linking capability, namely, it integrated WLAN module into the device, it may couple to the network through the network linking module, for example WiFi, WiMax, 802.11 standard.

The present invention changes the type of e-mail system and the content type of the mail. It providers better communication interface and pleasure. Therefore, the user may send a true and warm image and vocal message of the send to the receiver through computer e-mail system instead of cold text message.

As will be understood by persons skilled in the art, the foregoing preferred embodiment of the present invention is illustrative of the present invention rather than limiting the present invention. Having described the invention in connection with a preferred embodiment, modification will now suggest itself to those skilled in the art. Thus, the invention is not to be limited to this embodiment, but rather the invention is intended to cover various modifications and similar arrangements included within the spirit and scope of the appended claims, the scope of which should be accorded the broadest interpretation so as to encompass all such modifications and similar structures. While the preferred embodiment of the invention has been illustrated and described, it will be appreciated that various changes can be made therein without departing from the spirit and scope of the invention.

I claim:

1. A code division multiple access (CDMA) mobile phone with CDMA protocol and an audio/video electronic mail generator comprising: a control unit; an audio/video e-mail generator provided to generate an audio/video e-mail; a microphone coupled to said audio/video electronic mail generator; an image capturing device coupled to said audio/video electronic mail generator to record and capture vocal and image message of a user oneself; an address book providers to access to directory information; a spooler coupled with messaging application programming interface (MAPI) of said audio/video electronic mail generator, wherein said MAPI provides high-level function to implement sophisticated messaging features with a relatively small amount of code, a messaging application programming interface service provider located between said messaging application programming interface and a messaging system; wherein said audio/video e-mail is processed by said audio/video electronic mail generator and transmitted and received by said CDMA protocol;

when said audio/video e-mail is received by a receiver, said receiver's spooler performing post processing; wherein said receiver opens said audio/video e-mail being displayed by an audio/video type to allow said receiver output an audio message through a speaker and display a video signal on a display of said receiver.

2. A method for code division multiple access (CDMA) mobile phone to transmit and receive audio/video e-mail, comprising:

providing a CDMA mobile phone with CDMA protocol and an audio/video electronic mail generator comprising: a control unit; an audio/video e-mail generator provided to generate an audio/video e-mail; a microphone coupled to said audio/video electronic mail generator; an image capturing device coupled to said audio/video electronic mail generator; an address book providers to access to directory information; a spooler coupled with messaging application programming interface (MAPI) of said audio/video electronic mail generator, wherein said (MAPI) provides high-level function to implement sophisticated messaging features with a relatively small amount of code, a messaging application programming interface service provider located between said messaging application programming interface and a messaging system; wherein said audio/video e-mail is processed by said audio/video electronic mail generator and transmitted and received by said CDMA protocol;

activating said audio/video e-mail generator for generating at least one of audio and video e-mail;

selecting said audio/video e-mail generator to prepare said audio/video e-mail;

triggering said microphone and said image capturing device to store vocal and image message of a user oneself to generate said audio/video e-mail; and sending said audio/video e-mail through said CDMA protocol;

when said audio/video e-mail is received by a receiver, said receiver's spooler performing post processing; wherein said receiver opens said audio/video e-mail being displayed by an audio/video type to allow said receiver output an audio message through a speaker and display a video signal on a display of said receiver.

3. The method of claim 2, further comprising showing text message on said display.

4. A method to transmit and receive audio/video e-mail through an audio/video electronic mail generator in a remote terminal server, comprising:

coupling a local terminal computer to said remote terminal server through an internetwork;

providing said remote terminal server with said audio/video electronic mail generator, and providing said local terminal computer with a microphone and an image capturing device, wherein said audio/video e-mail generator couples to said microphone and said image capturing device through said internet; wherein said audio/video e-mail is processed by said audio/video electronic mail generator;

activating said audio/video e-mail generator located at said remote terminal server for generating said audio/video e-mail;

selecting said audio/video e-mail generator to prepare said audio/video e-mail;

triggering said microphone and said image capturing device at said local terminal computer to store vocal and image message of a user oneself to generate said audio/video e-mail; and sending said audio/video e-mail from said remote terminal server through said internet; when said audio/video e-mail is received by a receiver, said receiver opening said audio/video e-mail, and said audio/video e-mail being displayed by an audio/video type instead of text to allow said receiver output an audio message through a speaker and display a video signal on a display of said receiver;

wherein said remote terminal server comprising a spooler located at messaging application programming interface (MAPI) of said audio/video electronic mail generator, wherein said messaging application programming interface provides high-level function that can be used to implement sophisticated messaging features with a relatively small amount of code, a messaging application programming interface service provider located between said messaging application programming interface and a messaging system.

5. The method of claim 4, wherein said remote terminal server further comprising an address book provider to access to directory information.

* * * * *